United States Patent
Dukerschein et al.

(10) Patent No.: US 10,027,783 B2
(45) Date of Patent: Jul. 17, 2018

(54) PROTECTIVE COVER FOR AN ELECTRONIC DEVICE INCLUDING IMPACT GEOMETRY

(71) Applicant: Samsonite IP Holdings S.àr.l., Luxembourg (LU)

(72) Inventors: Jon Karl Dukerschein, San Francisco, CA (US); Bryan Lee Hynecek, Redwood City, CA (US); Hesam Khodabakhshi, San Mateo, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 50 days.

(21) Appl. No.: 15/315,169

(22) PCT Filed: Jun. 1, 2015

(86) PCT No.: PCT/IB2015/001641
§ 371 (c)(1),
(2) Date: Nov. 30, 2016

(87) PCT Pub. No.: WO2015/181644
PCT Pub. Date: Dec. 3, 2015

(65) Prior Publication Data
US 2017/0187853 A1  Jun. 29, 2017

Related U.S. Application Data

(60) Provisional application No. 62/005,419, filed on May 30, 2014.

(51) Int. Cl.
*H04M 1/00* (2006.01)
*H04M 1/02* (2006.01)
*H04M 1/18* (2006.01)
*G06F 1/16* (2006.01)
*A45C 13/02* (2006.01)
*A45C 13/00* (2006.01)

(52) U.S. Cl.
CPC ......... *H04M 1/0283* (2013.01); *A45C 13/002* (2013.01); *A45C 13/02* (2013.01); *G06F 1/1633* (2013.01); *H04M 1/185* (2013.01)

(58) Field of Classification Search
CPC ........ H04B 1/3833; H04B 1/385; H04B 1/38; H04B 1/3888; H04M 1/0214; H04M 1/0283; H04M 1/18
USPC ................................. 455/90.3, 550.1, 575.8
See application file for complete search history.

(56) References Cited

U.S. PATENT DOCUMENTS 8,509,865 B1 *  8/2013  LaColla ................. H04M 1/04
                                                 455/556.1
8,655,422 B2 *  2/2014  Stiehl ................. B29C 45/1676
                                                 361/730

(Continued)

FOREIGN PATENT DOCUMENTS

KR      10-1379936      4/2014
WO    WO 2012/149304   11/2012

OTHER PUBLICATIONS

International Search Report and Written Opinion issued in corresponding PCT International Application No. PCT/IB2015/001641 dated Nov. 20, 2015.

*Primary Examiner* — Nhan Le
(74) *Attorney, Agent, or Firm* — Haug Partners LLP

(57) ABSTRACT

A case for an electronic device comprising a frame or shell, a protective perimeter, and an interior with impact geometry.

19 Claims, 7 Drawing Sheets

(56) References Cited

U.S. PATENT DOCUMENTS

| | | | |
|---|---|---|---|
| 8,843,184 B2 * | 9/2014 | Kim ..................... | G06F 1/1626 343/702 |
| 2013/0292269 A1 | 11/2013 | Tages | |
| 2014/0274232 A1 * | 9/2014 | Tages ................... | H04M 1/185 455/575.8 |
| 2016/0043764 A1 * | 2/2016 | Huang .................. | H01M 10/46 455/575.8 |

* cited by examiner

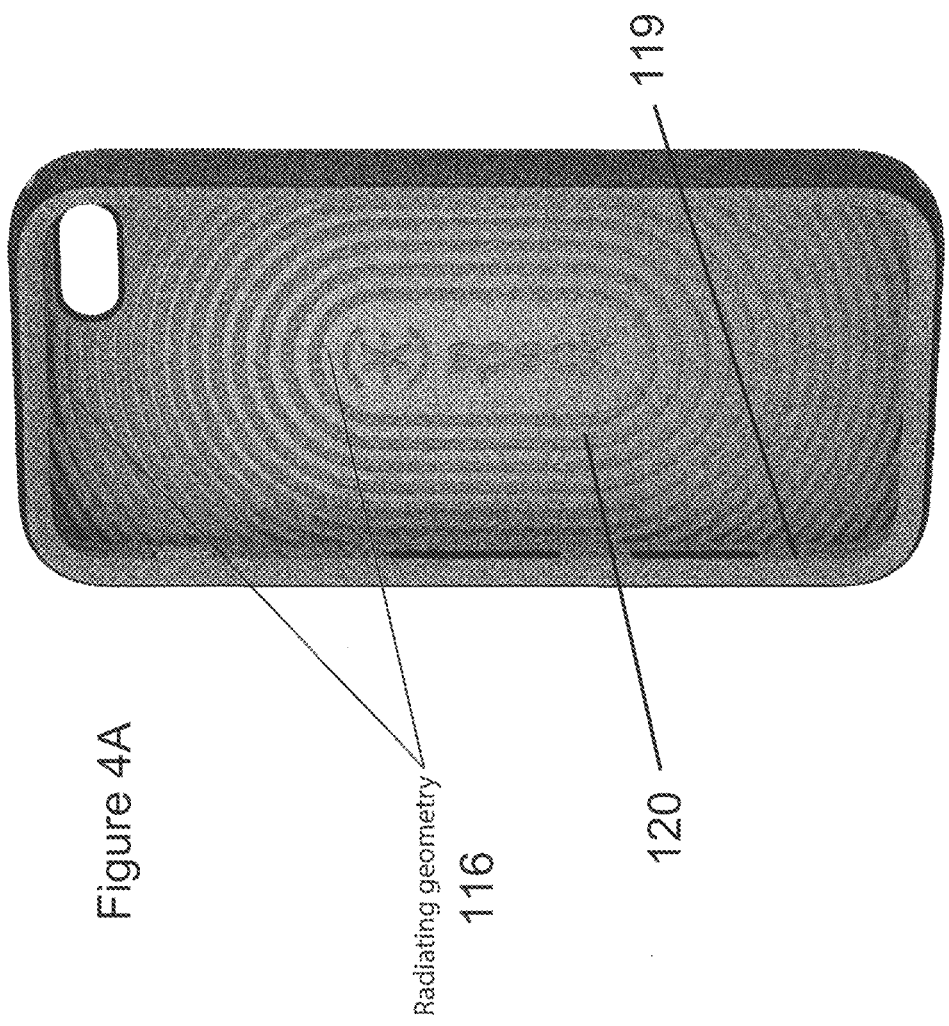

PROTECTIVE COVER FOR AN ELECTRONIC DEVICE INCLUDING IMPACT GEOMETRY

The present application claims priority from International Patent Application No. PCT/US15/33523 filed on Jun. 1, 2015, which claims priority from U.S. Provisional Patent Application Ser. No. 62/005,419 filed on May 30, 2014, the disclosures of which are incorporated herein by reference in their entirety.

FIELD OF THE INVENTION

A case for an electronic device comprising a frame or shell, a protective perimeter, and an interior with impact geometry.

Cases for mobile devices have been designed to provide at least some protection from impact events, such as when the device is dropped, hit, or otherwise struck. In order to provide such protection, materials are often employed which noticeably increase the thickness and weight of the case, and thus of the resultant protected device.

SUMMARY OF THE INVENTION

As such, it is desirable to provide a new case for a protective device which can provide increased shock/impact protection to a mobile device while minimizing the thickness and weight of case.

According to the present invention there is therefore provided a case for a mobile device as described by way of example below and in the accompanying claims.

In one embodiment of the invention there is provided a case for an electronic device which includes a rigid molded shell, an impact absorbent perimeter portion, and an elastomeric interior core. The rigid molded shell includes a rear side having a rear-side outer surface and a rear-side inner surface, and peripheral sides which each extends from the rear side in a direction of the rear-side inner surface and has a, peripheral-side outer surface and a peripheral-side inner surface. The impact absorbent perimeter portion covers at least a portion of at least one of the peripheral-side outer surfaces of the rigid molded shell. The elastomeric interior core covers at least a portion of at least one of the rear-side inner surface and the peripheral-side inner surfaces of the rigid molded shell.

In another embodiment, the interior core comprises impact geometry including gaps and ridges, the ridges being configured to deflect into the gaps on impact.

In yet another embodiment, the ridges are configured in a pattern of concentric shapes.

In a further embodiment, the ridges are shaped as ellipses or are pill-shaped.

In yet a further embodiment, the ridges are closed shapes, each of which comprises one continuous unbroken ridge with no beginning or end.

In another embodiment, each continuous unbroken ridge is not directly connected to another ridge.

In yet another embodiment, the interior core includes a rear side which covers the rear-side inner surface of the rigid molded shell, and the impact geometry is arranged on the rear side of the interior core. Also, a distance between adjacent ridges of the impact geometry decreases from a center of the rear side towards an outer edge of the rear side.

In a further embodiment, the rear side of the interior core includes a rear-side outer surface which faces towards the rear side of the rigid molded shell, and a rear-side inner surface which faces away from the rear side of the rigid molded shell. The impact geometry may be arranged on the rear-side inner surface of the interior core so as to face towards the electronic device when the electronic device is arranged within the case. The impact geometry may additionally or alternatively be arranged on the rear-side outer surface of the interior core so as to face away from the electronic device when the electronic device is arranged within the case.

In yet a further embodiment, the case includes at least one material selected from rigid materials, plastic, elastic materials, rubber, wood, glass, mirror, metal, alloy, fabric, and quartz.

In another embodiment, the rigid molded shell includes at least one material selected from rigid materials, rigid plastic materials, semi-rigid plastic materials, rigid rubber materials, polycarbonate materials, para-aramid materials, elastic materials, wood, glass, mirror, metal, alloy, fabric, and quartz.

In yet another embodiment, the case comprises at least one material selected from elastic materials and rubber.

In a further embodiment, the rigid molded shell includes at least one material selected from rigid materials, rigid plastic materials, semi-rigid plastic materials, rigid rubber materials, polycarbonate materials, para-aramid materials, wood, glass, mirror, metal, alloy, fabric, and quartz.

In yet a further embodiment, the impact absorbent perimeter portion includes at least one elastomeric material.

In another embodiment, the rigid molded shells permanently attached to the impact absorbent perimeter portion. This may be accomplished by co-molding, co-casting, or otherwise adhering the rigid molded shell to the impact absorbent perimeter portion.

In yet another embodiment, the rigid molded shell is mechanically attached to the impact absorbent perimeter portion so that the rigid molded shell and the impact absorbent perimeter portion are manually separable.

In a further embodiment, the rigid molded shell is permanently attached to the elastomeric interior core. This may be accomplished by is co-molded, co-casted, or otherwise adhering the rigid molded shell to the elastomeric interior core.

In yet a further embodiment, the rigid molded shell is mechanically attached to the elastomeric interior core so that the rigid molded shell and the elastomeric interior core are manually separable.

In another embodiment of the invention there is provided a case for an electronic device which includes a rigid molded shell and an elastomeric interior core. The rigid molded shell includes a rear side having a rear-side outer surface and a rear-side inner surface, and peripheral sides which each extend from the rear side in a direction of the rear-side inner surface and having a peripheral-side outer surface and a peripheral-side inner surface. The elastomeric interior core covers at least a portion of at least one of the rear-side inner surface and the peripheral-side inner surfaces of the rigid molded shell. The interior core includes impact geometry comprising gaps and ridges. The ridges are configured to deflect into the gaps on impact, and are shaped as ellipses or are pill-shaped.

It is noted that the features of the above-described embodiments are not exclusive to each other, and that any one of the above embodiments/features can be combined with one or more of the other embodiments/features to arrive at further embodiments.

The inventive case can be designed to fit a variety of mobile devices such as smartphones and other portable electronic devices.

DETAILED DESCRIPTION OF EMBODIMENTS

Figure 1:
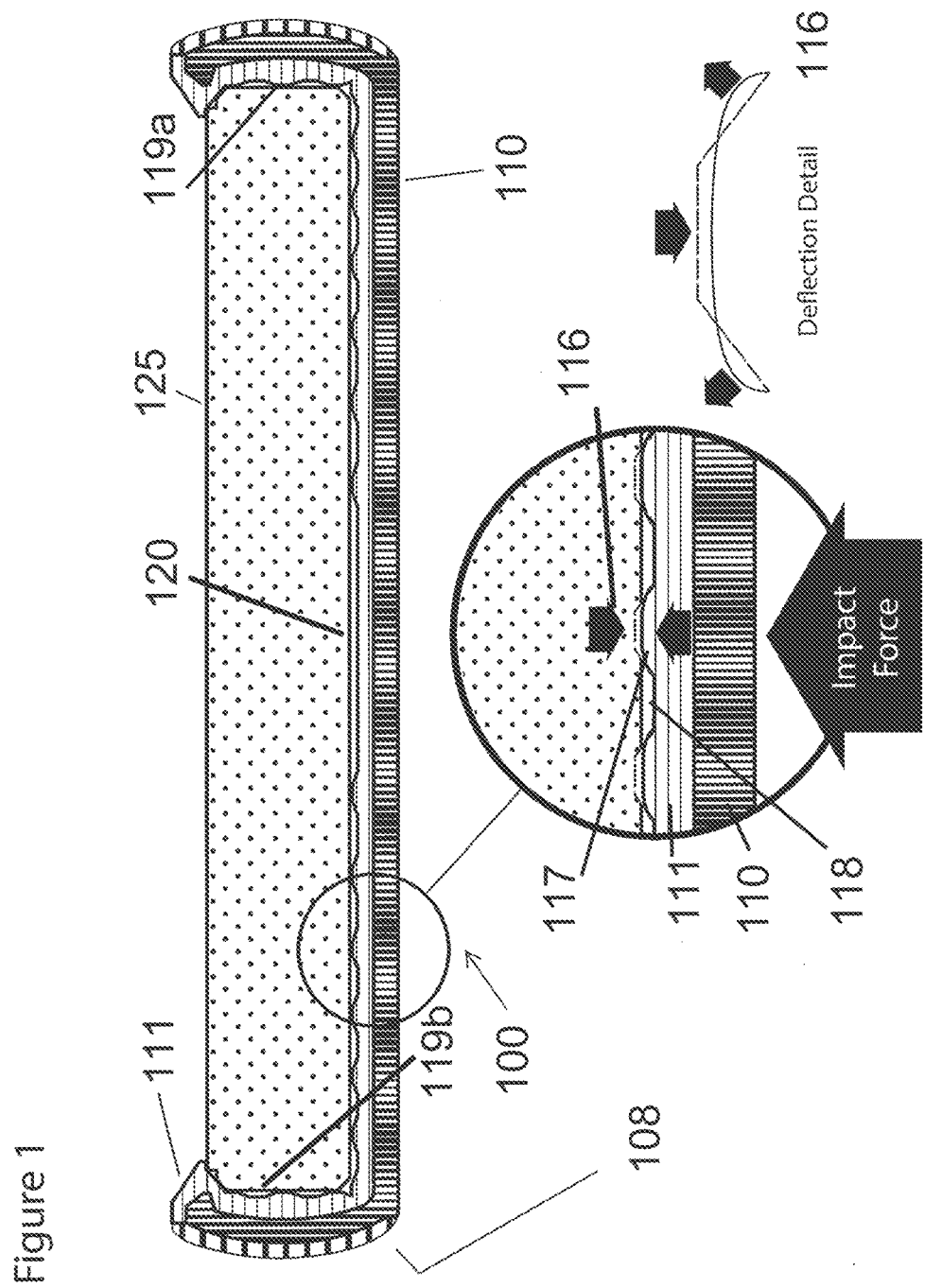
FIGS. 1-4C show exemplary embodiments of protective case.

As used herein a protective "case" or "cover" broadly encompass all forms of protective coverings anti parts thereof for personal electronic devices as known in the art, including cases, skins, faceplates, shields or covers applied to the device for protection or style. Embodiments described herein are not limiting but are offered to give a clear understanding of the invention, which can be employed in all such protective cases or covers.

FIGS. 1-5 show exemplary embodiments of a protective case 100. Exemplary personal electronic devices 125 include those referred to herein, including mobile telephones, so called "smart phones" (e.g., iPhone™, Android™, or Blackberry™, laptop computers, tablet computers, digital audio players, GPS units, MP3 players, tablets, cameras, and the like. The case includes an opening configured to provide access to the device. The case 100 is configured to protect the device 125 from impacts. In an embodiment, an exterior of the case 100 can be designed to mimic the finish of existing electronic devices, for example for users who prefer the feel and look of the original device 125 and would like to maintain that feel but still want protection for their device 125. The case 100 comprises a frame or shell layer 110 and at least one interior layer 111. An example of a case with more than one layer including an exterior layer and interior layer is disclosed in U.S. patent application Ser. No. 12/366,769, filed on Feb. 6, 2009 and published as U.S. Pat. Pub 2010/0203931, entitled "One Piece Co-formed Exterior Hard Shell Case with an Elastomeric Liner for Mobile Electronic Devices," the entirety of which is incorporated by reference hereby.

The embodiments of the protective case 100 provide at least dual layer protection for the whole device 125 and three layers of protection around a perimeter 108 of the case. The three-part architecture is configured to provide efficient protection with a smaller volume of material than a standard one or multi-part conventional case design. An elastomeric perimeter 108 is able to absorb extra impact, provide enhanced grip to the user, and more resistance to scratching or cracking than a rigid material. The rigid frame or shell 110 offers a sturdy and robust structure to the case that disperses impact forces. The elastomeric core 111, which can optionally include internal geometry 116, is configured to absorb remain ere as well as help decelerate the device during free fall.

The elastomeric perimeter 108 is preferably formed from a soft elastomeric material which provides at least some shock protection from impact events such as drops or falls. Examples of suitable materials include thermoplastic elastomers ("TPEs"), thermoplastic polyurethane ("TPU"), silicone, rubber, and any combination thereof.

Frame or shell layer 110 may be fabricated from, for example and without limitation, metal, a rigid or semi-rigid plastic material, a rigid rubber material, a polycarbonate material, a para-aramid material and/or some combination thereof and may be any color or texture. The material for case 100 or molded rigid frame or shell 110 can be selected from the following list (or their combinations) of rigid materials: plastic, elastic material, rubber, any artificial material, wood, glass, mirror, smooth, rough, coarse material or surface, metal, alloy, fabric, natural material, convex, concave, flat surface, quartz, transparent, translucent, opaque material, uniform, or non-uniform surface.

In an embodiment, the frame or shell layer 110 and perimeter layer 108 can be configured to have a low coefficient of friction. This allows the device to easily be slipped in and out of pockets easily without becoming attached or without great resistance to clothing materials.

Figure 2:
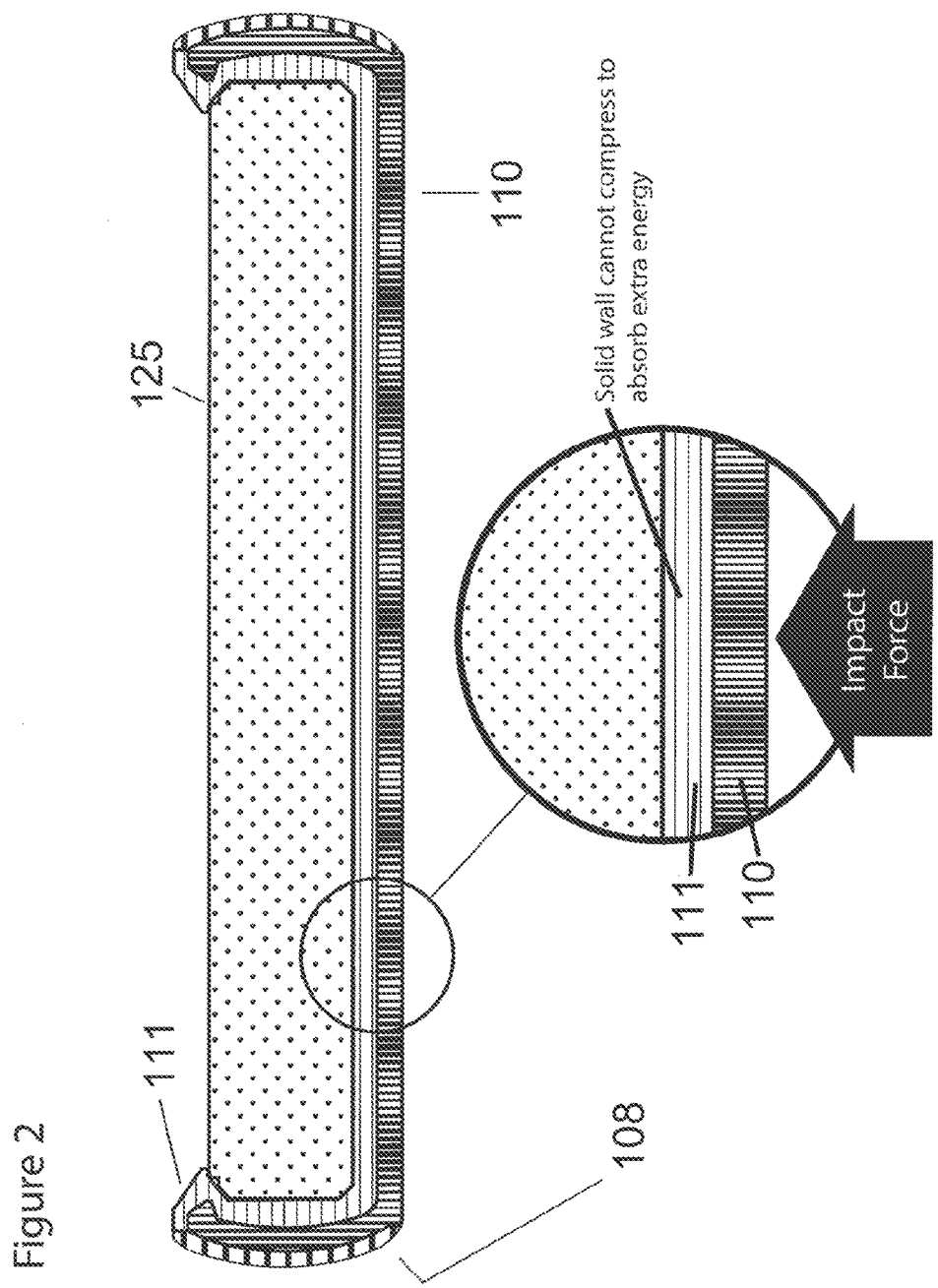

FIG. 1 shows cut-away cross-sectional an embodiment of the protective case or covering 100 including the impact geometry. The architecture is configured to form a protective case 100 for personal electronic devices 125. As noted above, the architecture comprises a 3 part molded case 125 that includes:

1. A soft elastomeric molded perimeter 108 that provides grip and absorbs impact;
2. A rigid molded frame or shell part 110 with a rear side 123 and peripheral sides 124 (see FIG. 5); and
3. A soft elastomeric molded internal core 111 with molded geometry 116 that comprising raised areas and gap areas which creates a cross section with ridges 117 and recessed gaps 118. These recessed gaps 118 allow the geometry 116 to deflect during impact in order to more effectively absorb energy. The cross section of the internal core 111 allows more energy absorption when compared to a similar case with a solid wall cross section as shown in FIG. 2, which cannot compress effectively to absorb extra energy. The geometry 116 also aids in the deceleration of the device during free fall.

As shown in FIGS. 1-3 and FIGS. 4A-4C, the geometry of the surface of the internal core 111 is configured to absorb energy. The geometry 116 is a benefit to the user in that it acts like a series of tiny springs on the interior of the case 100. This results in a more efficient ratio of wall thickness to impact absorption. The geometry also uses less material than required by a solid wall resulting in a case that is lighter. For example, in the embodiment shown in FIG. 1, the cross-section shows the geometry 116 is configured as a series of raised areas or ridges 117 and recesses or gaps 118 between the ridges 117. In an embodiment, as shown in FIGS. 1-3 and FIGS. 4A-4C, each ridge 117 is narrow at the mating surface that contacts the device 125 and tapers to a base of the ridge to the gap 118. If there is an impact, the impact force causes the ridges 117 to accept energy from the direction of the device 125 on impact such that the ridges 117 compress and deflect into air gap area 118. In contrast, as shown in FIG. 2, a when the internal core 111 is formed as solid wall without the geometry, it does not compress to absorb the opposing energy from the direction of the impact force from the device 125. The interior layer 111 could be mechanically, thermally, chemically, or otherwise integrated or attached into the surrounding case 100. For example, the interior layer 111 may be inset/insert-molded or co-molded to the surrounding case 100.

Figure 3:
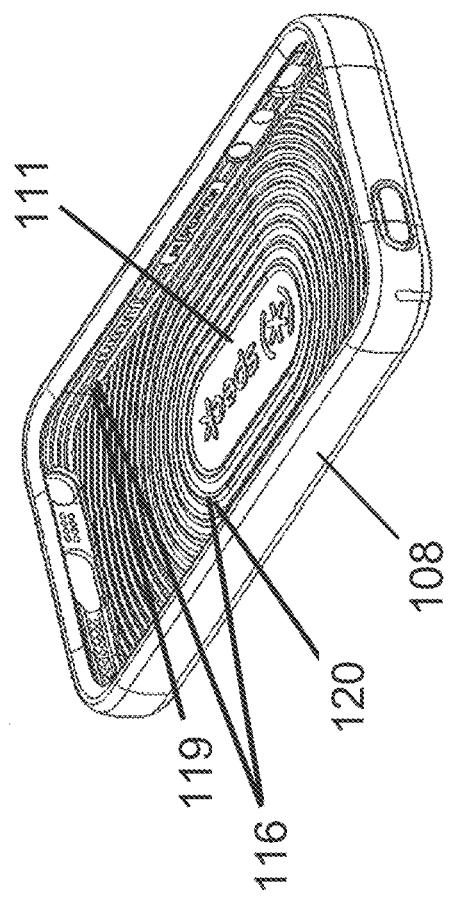

As shown in the embodiments shown in FIGS. 1 and 3, all mating surfaces 119a, 119b, 120 of the molded internal core 111 that hold the device 125 include the impact absorption geometry 116.

In another embodiment, one or more of the mating, surfaces 119, 120 but not all, can include the impact absorption geometry 116. For example, as shown in FIGS. 4A-4C, only the bottom mating surface 120 includes the impact absorption geometry 116.

Figure 4B:
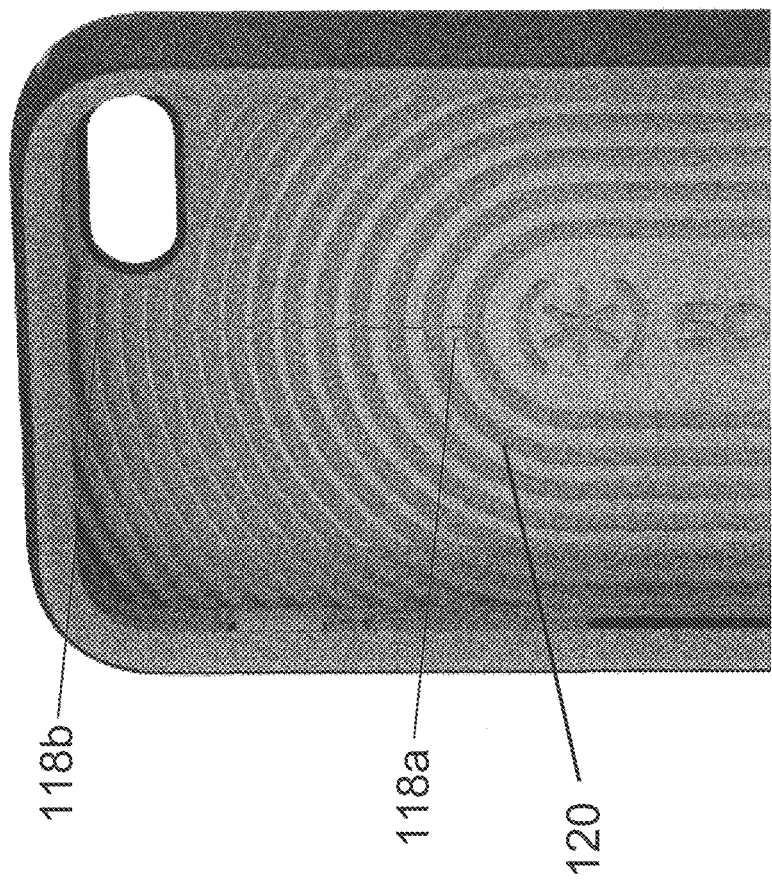

In an embodiment as shown in FIGS. 3 and 4A-4C, the geometry 116 is designed such that the ridges 117 are in the form of radiating geometry with a series of repeated swept co-centric ellipses or pill shapes initiating from the center of the case and radiating outward. In an embodiment, as shown in FIG. 3, the gaps 118 between the ridges 117 are evenly spaced. In the embodiments shown in FIG. 4A-4C, the gaps 118 between ridges 117 become progressively narrower so as to take the appearance of ripples on the surface of water. For example, as shown in FIG. 4B, pill shapes begin with wider spacing 118a between the ridges 117 near the center and get closer together to end with tighter spacing 118b as they approach the outside mating edge 119 of the case 100, appearing like ripples on the surface of water. Other design features can be incorporated; for example the ridges 117 can be given a matte finish or differing coloration to further distinguish them. For example, as shown in FIG. 4C, the geometry of the swept pill shaped ridges 117 are given a light texture to give them a matte surface finish 121, whereas the recessed gap areas 118 between the swept pill shaped ridges 117 are given a polished shiny surface finish 122 to create contrast between design elements. As will be appreciated the ridges 117 and gaps 118 can be formed in any design or series of shapes or patterns (e.g., co-centric parallelograms, triangles, circles, varying shapes, letters and symbols, combinations of shapes and patterns, and so on without limitation) and when designed with impact geometry 116, some or all of the raised areas or ridges 117 are configured to be compressible have sufficient gaps 118 between the ridges 117 to allow deflection and compression upon impact as described herein.

Figure 5:
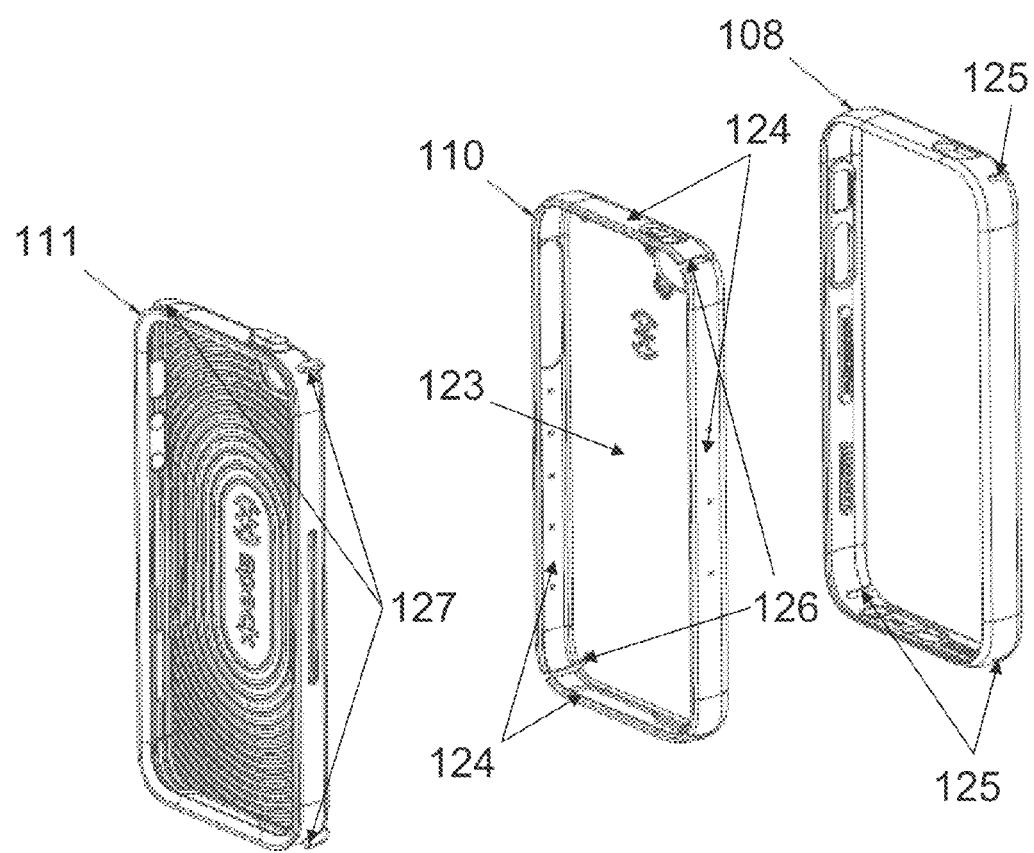
FIG. 5 shows an expanded view of a protective case 100 according to an embodiment of the invention.

The perimeter 108, frame or shell part 110, and internal core 111 may be separable from one another as three distinct pieces, such as is shown in the exploded FIG. 5. In such an instance, the three parts 108, 110, 111 can be configured so that two or more of the parts mechanically engage with each other to form a unitary case. For example, the perimeter 108 and the frame or shell part 110 may be designed with slots or cutouts 125, 126 into which corresponding ridges or ribs 127 of the internal core 111 engage (e.g., by snapping, pressure fitting, or any other suitable mechanical engagement), with the frame or shell part 110 being sandwiched between the perimeter 108 and the internal core 111.

Alternatively, two or more of the layers 108, 110, 111 may be co-molded/co-casted together or otherwise permanently affixed to each other, such as with an adhesive. The slots or cutouts 125, 126 and ridges or ribs 127 may still be included in the layers 108, 110, 111 even if they are co-molded, co-casted, inset-molded, or insert-molded. These cutouts 125, 126 and ridges or ribs 127 can add flexibility to the case to assist in insertion and removal of the electronic device from the case 100.

While FIGS. 1 and 3 show the impact geometry 116 being arranged on the interior surfaces of the internal core 111, it should be appreciated that the impact geometry 116 can also be arranged, in combination or in the alternative, on the exterior surfaces of the internal core 111 so that air gaps 118 are formed between the internal core 111 and the rigid frame or shell 110. In addition, while FIGS. 1 and 3 also show the impact geometry 116 being arranges on all five sides (i.e., the one rear side and four peripheral sides) of the internal core 111, it should be appreciated that the impact geometry 116 could instead be arranged on only some of the sides for example only on the rear side, only on one peripheral side, or any other combination of fewer than all five sides.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "leftside", "side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

It is appreciated that the optimum dimensional relationships for the parts of the invention, to include variation in size, materials, shape, form, function, and manner of operation, assembly and use, and all equivalent relationships to those illustrated in the drawings and described in the above description are intended to be encompassed by the present invention.

Furthermore, other areas of art may benefit from this method and adjustments to the design are expected. Thus, the scope of the invention should be determined by the appended claims and their equivalents, rather than by the examples and embodiments given.

In addition, it is noted that citation or identification of any document in this application is not an admission that such document is available as prior art to the present invention.

It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

The invention claimed is:
1. A case for an electronic device, said case comprising:
 a rigid molded shell comprising:
  a rear side having a rear-side outer surface and a rear-side inner surface; and
  peripheral sides, each peripheral side extending from the rear side in a direction of the rear-side inner surface and having a peripheral-side outer surface and a peripheral-side inner surface; and
 an elastomeric interior core which covers at least a portion of at least one surface selected from the group consisting of the rear-side inner surface and the peripheral-side inner surfaces of the rigid molded shell;

wherein the interior core comprises impact geometry comprising gaps and ridges, the ridges being configured to deflect into the gaps on impact; and wherein the ridges are closed shapes, each of which comprises one continuous unbroken ridge with no beginning or end.

2. The case according to claim 1;
wherein each continuous unbroken ridge is not directly connected to another ridge.

3. The case according to claim 1;
wherein the ridges are configured in a pattern of concentric shapes.

4. The case according to claim 1;
wherein the ridges are shaped as ellipses or are pill-shaped.

5. The case according to claim 1;
wherein the interior core comprises a rear side which covers the rear-side inner surface of the rigid molded shell, and the impact geometry is arranged on the rear side of the interior core; and wherein a distance between adjacent ridges of the impact geometry decreases from a center of the rear side towards an outer edge of the rear side.

6. The case according to claim 5;
wherein the rear side of the interior core comprises
a rear-side outer surface which faces towards the rear side of the rigid molded shell; and
a rear-side inner surface which faces away from the rear side of the rigid molded shell;
wherein the impact geometry is arranged on the rear-side inner surface of the interior core so as to face towards the electronic device when the electronic device is arranged within the case.

7. The case according to claim 5;
wherein the rear side of the interior core comprises:
a rear-side outer surface which faces towards the rear side of the rigid molded shell; and
a rear-side inner surface which faces away from the rear side of the rigid molded shell;
wherein the impact geometry is arranged on the rear-side outer surface of the interior core so as to face away from the electronic device when the electronic device is arranged within the case.

8. The case according to claim 1;
where the rigid molded shell is permanently attached to the elastomeric interior core.

9. The case according to claim 8;
where the rigid molded shell is co-molded or co-casted to the elastomeric interior core.

10. The case according to claim 1;
where the rigid molded shell is mechanically attached to the elastomeric interior core so that the rigid molded shell and the elastomeric interior core are manually separable.

11. The case according to claim 1, further comprising:
an impact absorbent perimeter portion which covers at least a portion of at least one of the peripheral-side outer surfaces of the rigid molded shell.

12. The case according to claim 11;
wherein the impact absorbent perimeter portion comprises at least one elastomeric material.

13. The case according to claim 11;
where the rigid molded shell is permanently attached to the impact absorbent perimeter portion.

14. The case according to claim 13;
where the rigid molded shell is co-molded or co-casted to the impact absorbent perimeter portion.

15. The case according to claim 11;
where the rigid molded shell is mechanically attached to the impact absorbent perimeter portion so that the rigid molded shell and the impact absorbent perimeter portion are manually separable.

16. The case according to claim 1;
wherein the case comprises at least one material selected from the group consisting of rigid materials, plastic, elastic materials, rubber, wood, glass, mirror, metal, alloy, fabric, and quartz.

17. The case according to claim 16;
wherein the case comprises at least one material selected from the group consisting of elastic materials and rubber.

18. The case according to claim 11;
wherein the rigid molded shell comprises at least one material selected from the group consisting of rigid materials, rigid plastic materials, semi-rigid plastic materials, rigid rubber materials, polycarbonate materials, para-aramid materials, elastic materials, wood, glass, mirror, metal, alloy, fabric, and quartz.

19. The case according to claim 18;
wherein the rigid molded shell comprises at least one material selected from the group consisting of rigid materials, rigid plastic materials, semi-rigid plastic materials, rigid rubber materials, polycarbonate materials, para-aramid materials, wood, glass, mirror, metal, alloy, fabric, and quartz.

* * * * *